Figure 1A:
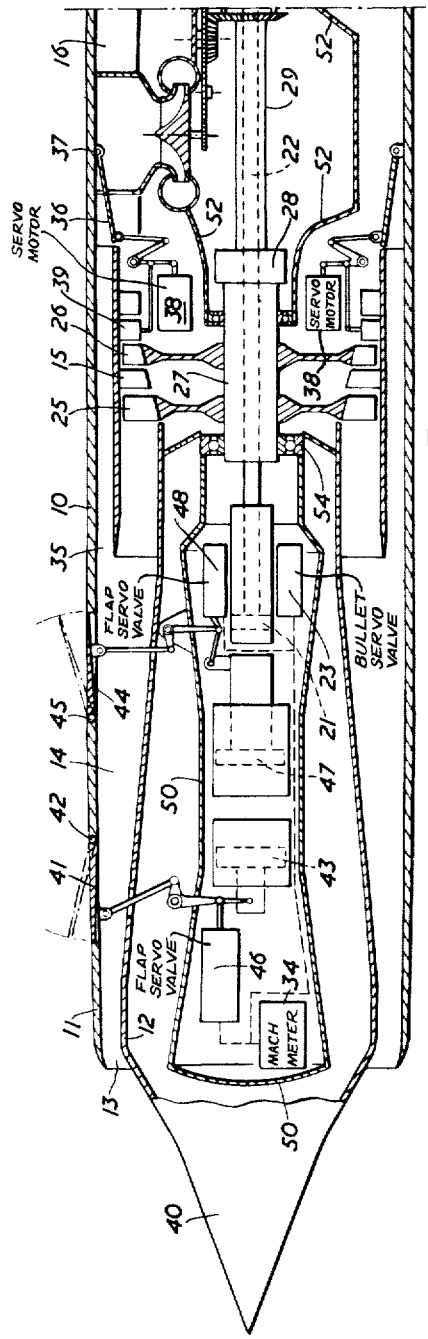

April 18, 1961     R. H. D. CHAMBERLIN ET AL     2,979,892
ROCKET-TURBO ENGINE CONVERTIBLE TO A RAMJET ENGINE
Filed June 13, 1958     2 Sheets-Sheet 1

INVENTORS
R.H.D. CHAMBERLIN, R.E. MORRIS,
A. L. DAVIES,
A. L. R. FLETCHER
BY
Watson, Cole, Grindle & Watson
ATTORNEYS

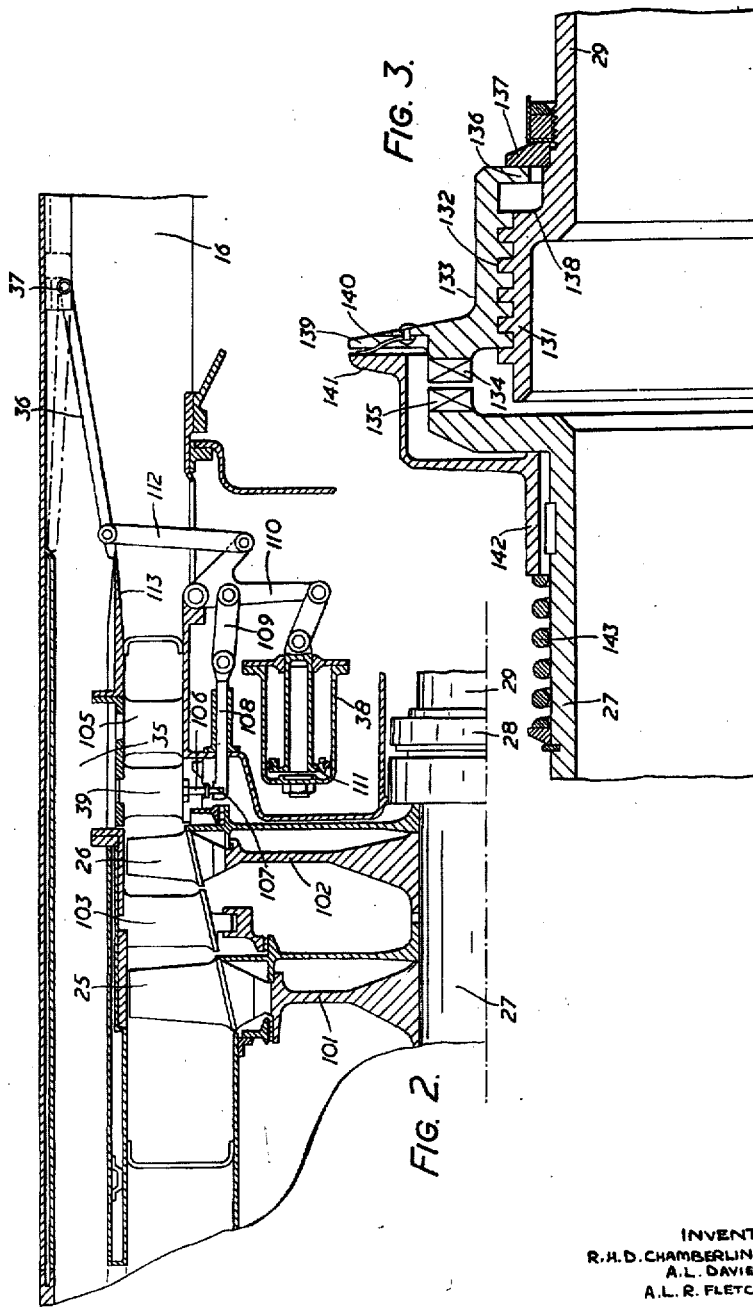

United States Patent Office
2,979,892
Patented Apr. 18, 1961

2,979,892
ROCKET-TURBO ENGINE CONVERTIBLE TO A RAMJET ENGINE

Reginald H. D. Chamberlin, Ronald E. Morris, Alan L. Davies, and Alan L. R. Fletcher, all of London, England, assignors to D. Napier & Son Limited, London, England, a British company Filed June 13, 1958, Ser. No. 741,937

Claims priority, application Great Britain July 3, 1957

3 Claims. (Cl. 60—35.6)

This invention relates to aircraft jet propulsion engines including a turbo-compressor comprising a turbine rotor coupled to a compressor rotor. The invention is particularly applicable to arrangements where it is desirable that the maximum air flow at the minimum pressure drop should be passed through the compressor passages when the turbine is not being driven. This may be due to a rise in pressure at the intake side of the compressor or to a drop in the power derived from the turbine or to both such factors.

According to the present invention a turbo compressor assembly forming part of a jet propulsion unit comprises a compressor rotor and a turbine rotor coupled to one another through a uni-directional clutch arranged to enable the compressor to over-run the turbine or to free-wheel or windmill when the turbine is stationary.

The invention is particularly applicable to aircraft jet propulsion engines of the compounded ram jet turbo-rocket type where a rocket motor is used to drive the turbine and the compressor supplies air to a main ram jet combustion chamber when the engine is operating at forward flight velocities below those sufficient to provide pure ram jet operation. In such engines the compressor is unnecessary at higher flight velocities and the rocket motor can be closed down. The turbine will then stop or at least tend to slow down but in order to maintain the maximum flow through the compressor to the main combustion chamber it is of advantage for the compressor rotor to rotate or windmill freely. This windmilling of the compressor can be improved by disconnecting the compressor from the turbine, whose rotor would exert a substantial drag on the compressor rotor.

According to another aspect of the invention therefore a jet propulsion engine of the compounded ram jet type includes a main combustion chamber and a propulsive exhaust nozzle, a compressor arranged to supply air to this chamber and means for supplying fuel to be burnt with the air in the chamber, a rocket engine, and a turbine driven by the rocket exhaust, the turbine being coupled to the compressor through a uni-directional clutch arranged to allow the compressor rotor to over-run the turbine rotor or to free-wheel or windmill when the turbine is stationary.

Preferably the compressor is provided with means for feathering at least one of the rings of stator blades so as to reduce the pressure drop across the compressor when the compressor is free-wheeling and the turbine is inoperative.

Moreover according to a preferred feature of the invention the compressor includes a by-pass duct connected between the upstream and downstream sides of the compressor and valve mechanism controlling the flow of air through this duct so as to allow an additional air flow to enter the main combustion chamber when the engine is operating as a ram jet, in addition to the flow of air through the windmilling compressor.

Figure 1B:
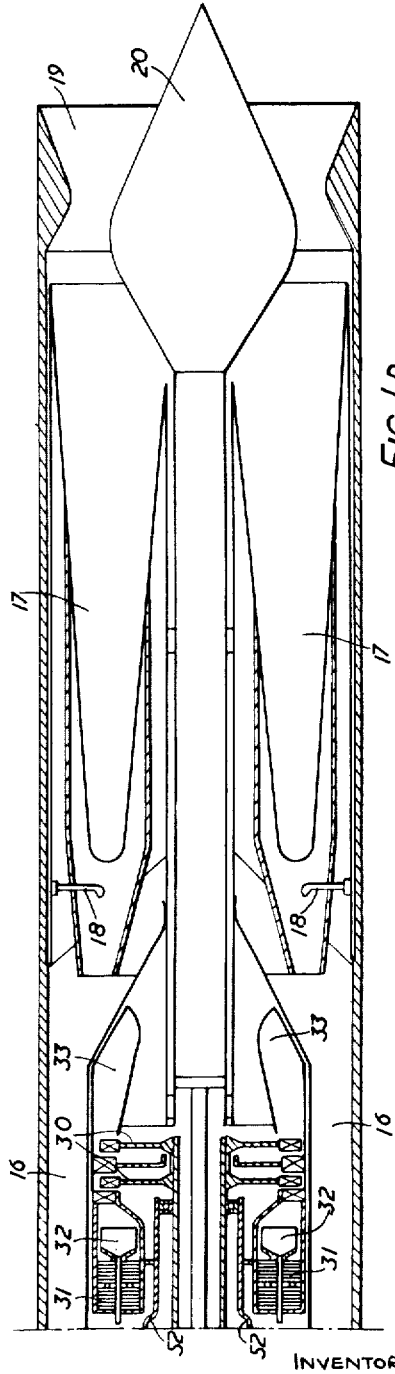

The invention may be performed in various ways but one specific embodiment will now be described by way of example with reference to the accompanying drawings in which Figures 1A and 1B together comprise a sectional side elevation through a compound ram jet turbo rocket engine.

Figure 2 is a sectional side elevation on an enlarged scale of the compressor included therein, and Figure 3 is a sectional elevation on an enlarged scale through the free wheel mechanism 28 between the turbine and compressor.

This engine is a compounded ram jet-turbo rocket engine. It includes an outer generally cylindrical casing 10, the front end 11 of which forms with a conical centre body 12 an annular air intake 13 leading to an axial diffuser passage 14 and then to an axial flow compressor 15 from which the air passes rearwardly through an annular air duct 16 into an annular combustion chamber 17 to which a hydrocarbon fuel such as kerosene is supplied through burners 18. The hot products of combustion issue through a nozzle 19 at the rear of the engine as a high speed propulsion jet. A bullet 20 is provided for adjusting the area of the nozzle, this bullet being axially movable by a hydraulic ram 21 disposed in the front part of the engine and connected to the bullet by a long shaft 22 extending rearwardly through the centre of the engine. The ram 21 is controlled by a follow-up servo valve 23.

The compressor comprises two rotor blade rings, 25, 26, mounted on a hollow shaft 27 which is connected by a freewheel mechanism 28 to another hollow shaft 29 at the downstream end of which is mounted a two stage axial flow turbine 30.

This turbine is driven by a rocket system including catalytic decomposition chambers 31 to which hydrogen peroxide is supplied and decomposed to form oxygen-rich steam, and rocket combustion chambers 32 into which some paraffin is then introduced for combustion with some of the oxygen. The combustion products are expanded in the turbine 30, and then pass through ducts 33 to enter the main combustion chamber 17 along with the air from the said annular duct 16, to contribute to the propulsive effect of the jet.

Provision is also made for the engine to operate as a pure ram jet when a sufficiently high speed has been reached. For this purpose an annular by-pass duct 35 is provided around the axial flow compressor 15, and the downstream end of this by-pass duct communicates through flap valves 36, pivoted at 37, with the said annular air duct 16 at the downstream end of the compressor. These flap valves 36 are actuated by hydraulic servo motors 38 which also actuate a ring of adjustable stator blades 39 for the last stage of the compressor, to increase the flow through the compressor and reduce losses therein during ram jet operation. At a predetermined Mach number, when the ram effect alone will provide sufficient compression of the air, and which is sensed by a Mach meter indicated generally at 34, the hydrogen peroxide and paraffin supply to the rocket system is automatically shut off, thus stopping the turbine 30 and removing the power supply for the axial flow compressor 15. At the same time the by-pass flap valves 36 are opened to allow air from the air intake 13 to pass through the annular by-pass duct 35 to the combustion chamber 17. The free wheel mechanism 28 between the turbine 30 and the axial flow compressor 15 permits the latter to "windmill" during ram jet operation.

The center body 12 has a conical nose tip 40, and cooperates with the outer cowl 11 to provide shock compression during ram jet operation. Behind the lip of the cowl at the beginning of the diffuser section 14 there is an annular port providing communication between the outside of the engine and the diffuser section. During ram jet operation this port is closed by a series of petal type flaps 41 pivotally attached to the outer shell of the engine at their rear ends 42. During turbo rocket operation at a relatively low Mach number these flaps are swung outwards as shown in chain lines by a hydraulic servo motor 43 controlled by a follow-up servo valve 46, so as to provide an additional annular air intake of larger diameter surrounding the main air intake 13.

Towards the rear end of the diffuser section 14 and upstream of the axial flow compressor 15 there is arranged another series of similar pivoted flaps 44 controlling another annular port in the outer shell 11 which constitutes a controllable spill port which is opened during ram jet operation to the extent required to maintain the desired shock pattern at the intake. These flaps 44 are pivotally connected to the shell at their upstream ends 45 and are opened outwards by a hydraulic servo motor 47 controlled by a follow-up servo valve 48.

Thermally insulated compartments are provided in the engine within the annular air duct through the engine. There is a front compartment 50 lying mainly within the diffuser section 14 and terminating adjacent the forward end of the compressor 15. This compartment houses the hydraulic servo motors 43, 47 which are connected through mechanical linkages with the said two series of flaps 41 and 44, and their control valves 46, 48. It also houses the Mach meter 34 and the shock sensing system, a forward bearing 51 for the axial flow compressor 15, and the hydraulic ram 21 for adjusting the position of the nozzle bullet 20.

A second insulated compartment 52 surrounds the shaft 29 connecting the turbine to the compressor and encloses the freewheel mechanism 28, pumps for lubricant, servomotor fluid, paraffin and hydrogen peroxide, gearing for driving these pumps and other auxiliaries. This compartment also contains a sump of lubricating oil, two heat exchangers through which paraffin fuel is pumped in succession as a coolant and a metering unit for the paraffin and hydrogen peroxide.

The compressor 15 itself is of the two stage type including the two rotor blade rings 25, 26 mounted on rotor discs 101, 102, attached to the compressor shaft 27. Between the rotor blade rings there is mounted a ring of stator blades 103 which are angularly fixed and non-adjustable. Downstream of the second rotor blade ring 26 there is mounted a second ring of stator blades 39 which are each angularly adjustable about axes through each blade which are radial to the main axis of the compressor. A further series of fixed straightener vanes 105 is provided downstream of the second adjustable stator blade ring 39.

The blades 39 are each connected rigidly to a pin 106 capable of rotating in a bushing carried by a fixed part of the engine and the inner end of this pin is connected to an off-set crank 107 which is in turn connected through pivoted links 108 and 109 to a point on a bell crank lever 110 which is angularly adjustable by means of a double acting servo ram 38. The ram comprises a ram piston 111 connected to a piston rod passing through a gland at one end of the ram cylinder and means are also provided for admitting pressure fluid to either end of the ram cylinder as required under the control of an automatic servo valve. The servo valve itself forms no part of the present invention and will not therefore be described in detail. The hydraulic servo ram 38 is also arranged to actuate the flap valves 36. To this end the bell crank lever 110 is connected through a pivoted link 112 to a point at the upstream end of each flap valve. In the position illustrated the upstream end of the flap valve abuts against a cylindrical shield 113 which separates the by-pass passage 35 from the outlet passage of the compressor, both these passages communicating at their downstream ends with the annular air passage 16. In this position the flap valve 36 closes the by-pass passage 35 and air can only pass into the passage 16 via the compressor. In the other operative position of the flap valve 36 as illustrated in chain lines the by-pass passage 35 is opened to the passage 16 and air can then flow both through the compressor and through the by-pass passage.

In operation when the rocket turbine 30 is driving the compressor 15 the servo ram piston 111 is in the position illustrated and the flap valve 36 is closed preventing air flow through the by-pass passage. The compressor thus delivers air to the main combustion chamber 17 and operates normally at full efficiency.

When the engine has attained a forward flight velocity at which the ram pressure is sufficient to support combustion the supply of fuel to the rocket engine driving the turbine is automatically shut off and the turbine stops. At the same time the servo valve automatically reverses the high pressure connections to the ram cylinder 38 and the ram piston is moved to the right in Figure 2 thus opening the flap valves 36 so that the by-pass passage 35 allows air to flow around the compressor into the air passage 16, and at the same time the adjustable stator blades 39 are rotated into their second operative positions. In this position of the blades the maximum throat area is achieved with the minimum resistance to flow and the turbine rotor blade rings 25, 26 will windmill under the air flowing through the compressor thus augmenting the total air flow into the main combustion chambers 17.

The servo valve controlling actuation of the ram 38 may be arranged to be responsive to the speed of rotation of the turbine. Thus at all turbine speeds above a predetermined figure the servo valve will be arranged to hold the ram piston 111 in the position illustrated, while when the turbine speed falls below this value as a result of the fuel supply being shut off to the rocket combustion chambers the ram piston will move into its alternative operative position.

The free wheel mechanism 28 is illustrated in detail in Figure 3. The turbine shaft 29 is formed with a hollow cylindrical extension 131 at its end adjacent the compressor shaft 27 and the external surface of this extension piece is provided with a quick pitch helical screwthread 132. Co-operating with this screwthread is an internal screwthread sleeve 133 which constitutes a movable clutch member and which is formed with a ring of dogs 134 which can be engaged with a corresponding ring of dogs 135 formed on a flange secured to the compressor shaft 27. The sleeve 133 is also provided with an inwardly projecting radial flange 136 which in the position shown abuts against a locking ring 137 while in the other limiting position of the sleeve this flange abuts against a shoulder 138 formed on the turbine shaft. The sleeve 133 is also formed with an outwardly projecting radial flange 139 to which are connected a series of resilient friction leads 140 which bear against the face of a flange 141 formed of a sleeve 142 which is splined or keyed to the compressor shaft 27. This sleeve 142 is urged towards the turbine shaft by a compression spring 143.

In the position illustrated in Figure 3 the dogs 134, 135 are out of engagement and the mechanism is in its free wheeling position. The compressor shaft 27 can rotate in a clockwise direction when viewed from the turbine and there will be a slight frictional drag between the friction leads 140 and the flange 141.

If the turbine shaft 29 is driven in this same direction of rotation at a speed faster than the compressor shaft 27 the frictional drag on the leads will cause the sleeve 133 to rotate on the quick pitch screwthread 132 and the sleeve will move axially towards the compressor until the dogs 134, 135 engage and ultimately the flange 136 on the sleeve abuts against the shoulder 138. During this axial movement of the sleeve a spring 143 will be compressed thus increasing the loading pressure between the leads 140 and the flange 141 and so increasing the frictional drag and hence the torque available for rotating the sleeve 133. When the dogs 134, 135 are fully engaged the turbine shaft 29 will then drive the compressor shaft 27.

What we claim as our invention and desire to secure by Letters Patent is:

1. A jet propulsion engine of the compounded ram jet turbo rocket type including a main combustion chamber, an unimpeded exhaust duct communicating therewith and with a propulsive exhaust nozzle, a compressor arranged to supply air to said chamber and means for supplying to be burnt with the air in the chamber, said compression including rings of stator blades, a rocket engine, and a turbine driven by the rocket exhaust, the turbine being coupled to the compressor through a unidirectional clutch constituting the sole driving connection between the turbine and the compressor and arranged to allow the compressor rotor to freewheel or windmill when the turbine is stationary and the unit is functioning as a ram jet engine.

2. A jet propulsion engine as claimed in claim 1 in which the compressor is provided with means for feathering at least one of the rings of stator blades so as to reduce the pressure drop across the compressor when the compressor is freewheeling and the turbine is inoperative.

3. A jet propulsion engine as claimed in claim 1 including a by-pass duct connected between the upstream and downstream sides of the compressor and discharging into the main combustion chamber, and a valve mechanism controlling the flow of air through said duct so as to allow an additional air flow to enter the main combustion chamber when the engine is operating as a ram jet, in addition to the flow of air through the windmilling compressor.

References Cited in the file of this patent

UNITED STATES PATENTS

| | | |
|---|---|---|
| 2,804,748 | Hutchinson | Sept. 3, 1957 |
| 2,857,092 | Campbell | Oct. 21, 1958 |
| 2,857,740 | Hall et al. | Oct. 28, 1958 |

FOREIGN PATENTS

| | | |
|---|---|---|
| 1,159,986 | France | Feb. 24, 1958 |
| 749,009 | Great Britain | May 16, 1956 |